(12) United States Patent
Zinkovsky et al.

(10) Patent No.: US 8,370,740 B2
(45) Date of Patent: Feb. 5, 2013

(54) DOCUMENT-LEVEL FEATURES IN ADD-INS

(75) Inventors: Igor Zinkovsky, Bellevue, WA (US); Michael Shneerson, Redmond, WA (US); David A. Whitechapel, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 832 days.

(21) Appl. No.: 12/046,297

(22) Filed: Mar. 11, 2008

(65) Prior Publication Data

US 2009/0235148 A1   Sep. 17, 2009

(51) Int. Cl.
G06F 17/00 (2006.01)
(52) U.S. Cl. ...................................................... 715/255
(58) Field of Classification Search .................. 715/255
See application file for complete search history.

(56) References Cited

U.S. PATENT DOCUMENTS

| | | | |
|---|---|---|---|
| 6,795,089 | B2 | 9/2004 | Rajarajan et al. |
| 7,206,941 | B2 | 4/2007 | Raley et al. |
| 2006/0085446 | A1 | 4/2006 | Thanu et al. |
| 2006/0282817 | A1* | 12/2006 | Darst et al. ............... 717/106 |
| 2007/0055936 | A1 | 3/2007 | Dhanjal et al. |
| 2007/0061382 | A1 | 3/2007 | Davis et al. |
| 2007/0136662 | A1 | 6/2007 | Khaba |
| 2007/0156897 | A1 | 7/2007 | Lim |
| 2008/0010387 | A1 | 1/2008 | Curtis et al. |

OTHER PUBLICATIONS

Carter et al, Visual Studio Tools for Office: Using C# with excel, Word, Outlook, and InfoPath, 2005, pp. 3, 5-8, 60-64, 433-435, 824-825, 933-934, 939-941.*
Eugene Starostin, "Add-in Express .NET and Microsoft Office PIAs", Mar. 2006, p. 1-5; available at: http://www.add-in-express.com/creating-addins-blog/2006/03/01/add-in-express-net-and-microsoft-office-pias/.*
Randell, Brian A., "Migrating a Document-Level Customization to an Application-Level Add-In", Dec. 2006, 25 pages.
Stubbs, Paul, "Add-In Power—Let Users Customize Your Apps With Visual Studio Tools for Applications", MSDN Magazine, Aug. 2006, 7 pages.
Pano, Soledad, "Working around VSTO SE's lack of document-customization for Excel 2007", Soledad Pano's Blog, Jun. 2007, 5 pages http://weblogs.asp.net/spano/archive/2007/06.aspx.
Ablebits, "Add-in Express", Copyright 2003-2008, http://www.ablebits.com/addin-express/index.php, Last viewed Feb. 6, 2008, 2 pages.

* cited by examiner

Primary Examiner — Doug Hutton, Jr.
Assistant Examiner — Shawn S Joseph
(74) Attorney, Agent, or Firm — Workman Nydegger

(57) ABSTRACT

The invention enables document level controls to be added to applications which display documents by using an application level add-in. The application level add-in tracks document opening and closing and dynamically constructs the document level control accordingly to ensure that the document level control is active only while the document is open.

15 Claims, 2 Drawing Sheets

DOCUMENT-LEVEL FEATURES IN ADD-INS

BACKGROUND

Background and Relevant Art

Computers and computing systems have affected nearly every aspect of modern living. Computers are generally involved in work, recreation, healthcare, transportation, entertainment, household management, etc.

Some computer application programs include the ability to host documents. Documents can be created, accessed, printed, edited, etc. in the application program. The following illustrates a number of examples applications and corresponding documents. Word processing applications may host word processing documents. Spreadsheet applications may host documents including workbooks and spreadsheets. Presentation applications may host individual slide documents or a combination of slides in a deck document. Web development applications may host web page documents. Simulation applications may host simulation documents. Various other applications may host various documents although not specifically enumerated here.

Additional controls, other than those normally implemented by default with applications or documents, may be created through programmatic means. A runtime library may include a number of custom control objects. These custom control objects typically extend or enhance native application objects. The additional controls may be applied to an application in general or to document instances. For document level controls, the use of additional controls placed on the document surface is restricted to the particular document. For example, Visual Studio® Available from Microsoft® Corporation of Redmond Wash. may be implemented for use with Microsoft's Office® products. Visual studio allows a developer to add document level controls to Microsoft® Office® documents. For example, Visual Studio Tools for Office® (VSTO) may be used to add custom artifacts for both document level and application level solutions. For example, custom buttons, bookmarks, links, or other functionality may be added to a document. Specific examples for Microsoft® Office® products include the ListObject control and the NamedRange control for Microsoft® Excel®. Other examples include the XMLNodes control, the Bookmarks control and Content controls for Microsoft® Word®. In one example of a document level solution, the developer can create an instance of a custom ListObject control on the surface of an Excel® workbook document.

Document level solutions are specific to a specific document. That is, the document is associated with some code, and when the document is loaded, the code starts to run. The code only runs while the document is loaded. An application level add-in, on the other hand, is loaded when the application starts—regardless of which (if any) document is loaded—and continues to run until the application terminates. However, document level add-ins and application level add-ins are separately developed and implemented. If a document level add-in is needed, then a developer creates the appropriate programmatic code to implement the add-in. In some embodiments, this may be done graphically using tools such as Visual Studio®. If an application level add-in is needed, a developer may create programmatic code to implement the application level add-in.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment described herein includes a method which may be practiced in a computing environment including an application. The application hosts documents. The method includes acts for facilitating an application level add-in to add document level controls. The method includes determining that a document has been opened or created. The method further includes determining from an application level add-in, a class of documents for which document level controls should be added. It is determined that the document that has been opened or created is in the class of documents. A document level control specified in the application level add-in is added to the document.

In another embodiment, a computer readable medium comprising computer executable instructions may be implemented in a computing environment including an application. The application hosts documents. The computer readable medium includes computer executable instructions that when executed by a processor are configured to cause various acts to be performed. In particular, a determination is made that a document has been opened or created. Further, a determination is made that a document level control should be added to the document based on programmatic code implemented in an application level add-in. As a result of determining that a document level control should be added to the document based on programmatic code implemented in an application level add-in; a native control is wrapped in a wrapper to allow the native control to be implemented as a document level-add in for the document. The wrapped native control is added as a document level control into the document.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein are directed to allowing an application wide add-in to create custom controls at the document level. For example, a developer may be able to create an application wide add-in that is able to create a custom control for a given class of documents. Notably, the class of documents may include all documents created or opened in the application, or for some other class such as documents created using a particular template, documents created or used by a user with a particular role, documents opened or created in a particular security environment, or based on other factors. In particular, embodiments are implemented to combine the capabilities of document-specific customizations and application-wide customizations. In other words and for example, some embodiments enable the use of document surface customization from within application wide add-ins.

Document level custom controls may be manifest in various fashions including graphical instantiations which include additions to menu choices, added tool-bar functionality, controls including graphical user interface elements displayed directly on the surface of the document, controls for manipulation or description of rows and columns, etc. Typically a document is created with the purpose of conveying or allowing access to some information. The surface of the document is that portion of the document which typically displays or allows access to that information. For example, the surface of the document typically excludes menu and toolbars while including areas that display the data for which purpose the document was created.

Additionally, embodiments may be implemented to utilize functionality available in pre-existing solutions. For example, as discussed above, application may include or have access to pre-existing solutions that allow custom controls to be created specifically by a user for a given document. Some embodiments herein may allow pre-existing solution controls in legacy programs to be wrapped in a special wrapper which allows document level controls to be implemented by application wide add-ins.

Figure 1:
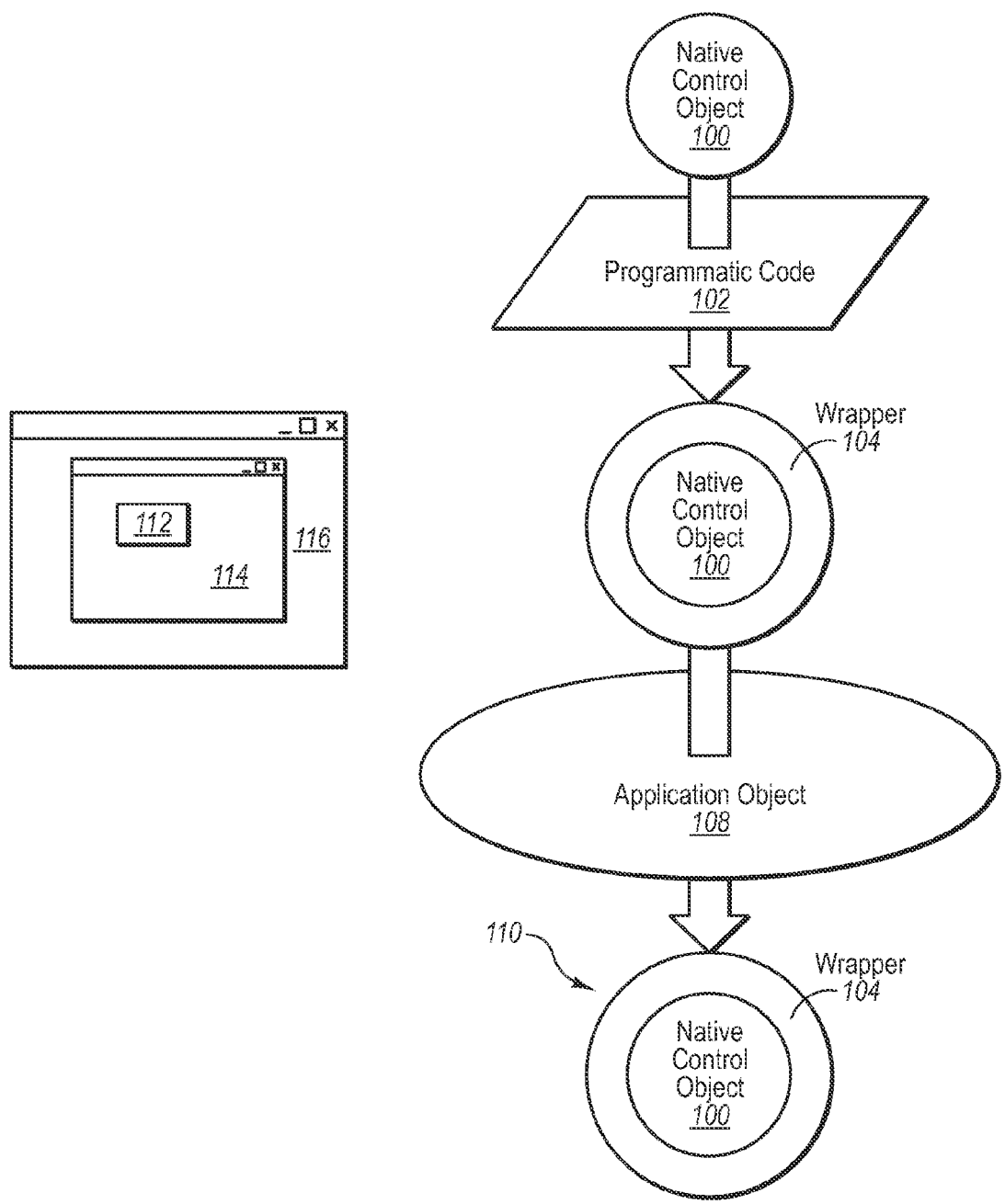
FIG. 1 illustrates examples of native control objects being used in application-level add-ins.

Referring now to FIG. 1, an example is illustrated. FIG. 1 illustrates a native control object 100. The native control object 100 may be a control implemented in an application framework which serves as the foundation for implementing controls in the applications or documents hosted by applications. In particular, in some embodiments, the native control object 100 may be implemented in pre-existing application object models allowing for the addition of controls in applications or documents hosted in the applications. Programmatic code 102 may be used to wrap a native control object in a wrapper to create an enhanced control. For example, FIG. 1 illustrates that after the programmatic code 102 operates on the native control object 100, the native control object 100 is wrapped in a wrapper 104. The wrapper 104 provides programmatic interfaces for code to operate on the native control object 100, and in particular, allows for an application level add-in 112 implemented using functionality of embodiments disclosed herein to use the native control object 100 to create a custom control for a document.

For example, FIG. 1 illustrates that an application object 108 includes programmatic code which operates through the wrapper 104 on the native control object 100. This results in a configured control 110. The configured control 110 implements a custom control 112 in a document 114 hosted by an application 116.

Notably, the application object 108 includes programmatic code which facilitates the build-up and tear-down of the configured control 110. In particular, it is desirable that the configured control 110 only exist substantially so long as a document instance 114 is opened in an application 116. Thus the application object 108 includes programmatic code to implement the configured control 110 when the document 114 is opened or created in the application 116, and provisions to tear down the configured control 110 when the document 114 is closed in the application 116. While such build-up and tear-down is not instantaneous and thus the configured control 110 may exist for short time periods when the document 114 is not opened in the application 116, a configured control 110 can nonetheless be considered to exist substantially only when the document 114 is openly in the application 116. Thus, as used herein, substantially existing only when the document is open may include at least build-up and tear-down time.

The following discussion illustrates additional details regarding how embodiments may include mechanisms by which an application level add-in can create document level controls. In particular, some preferred embodiments are implemented in, and thus illustrated in the context of Visual Studio Tools for Office® (VSTO) available from Microsoft® Corporation. However, it should be noted that even though this specific example is illustrated, the concepts and principles can be applied generically such that they are able to be implemented with other document hosting applications and with other add-in tools.

Some embodiments may include a design where an add-in can use the VSTO runtime library to dynamically construct all the necessary document-level artifacts and infrastructure when a document is opened, and tear these down when the document is closed. This includes setting up this infrastructure in such a way that it behaves the same as if the solution were in fact a document-level solution. This is the mechanism that performs the actual instantiation and lifetime management of host items. The instantiation mechanism effectively creates an independent document-level customization, but loaded into the existing application-level add-in's application domain. The VSTO runtime then sees this as a document-level customization, and can therefore reuse most of the existing runtime code to manage the creation, execution, and shutdown sequences as if it were a standalone document-level customization.

Embodiments may implement the use of class extension methods, which allows a customer to write code which seamlessly calls a custom method in the VSTO runtime as if it were a method on a standard Primary Interop Assembly object, typically included natively in Microsoft Office, to wrap that Primary Interop Assembly object as a VSTO custom object.

Although both VSTO document-level solutions and VSTO application-level add-ins share a common runtime library, there are some significant differences in behavior. The code that supports document-level solutions can assume that there is in fact a document available, and the class representing the document acts as the root object in the solution. For add-ins, there is an add-in class that represents the root object in the solution, and there is no assumption that there is a document available at any given time.

Embodiments may include functionality to address management of object lifetime. For example, the code for an application level add-in typically runs before any document is available, and continues to exist beyond the point where any given document is closed. Conversely, document-level controls should substantially only exist during the time while the document is open, and be cleaned up when the document is closed. Therefore, an application level add-in holds references to document-level controls functionality for determining when the document is closed (and the control references are no longer valid) and should be prevented from using the control references after that point.

Embodiments further include functionality where users do not have to perform multiple wrappings to be able to use controls, such as VSTO controls. For example, in spreadsheet applications, worksheets may be hierarchically lower than workbooks, which would typically require controls to be wrapped at each level of the hierarchy. However, embodiments implemented herein may utilize a simple method call to take any supported native objects, such Primary Interop Assembly objects in the Office® example, and give back an extended object wrapper, such as a VSTO wrapper. In particular, embodiments may utilize extension methods to native types, such as extension methods to Primary Interop Assembly types. For example, continuing with the VSTO specific example, a GetVstoObject( ) extension method may be provided on every Primary Interop Assembly type for which there is a VSTO equivalent, including controls such as the Excel ListObject, etc.

For example, obtaining a VSTO ListObject from a Primary Interop Assembly ListObject becomes just one line of code. The same technique would apply to worksheets or workbooks (if the user needs them). The following example fetches a standard Primary Interop Assembly ListObject from the collection of ListObjects in the active worksheet, and then wraps it as a VSTO-wrapped ListObject:

Microsoft.Office.Interop.Excel.ListObject
   piaListObject=this.Application.ActiveSheet.ListObjects[1];
Microsoft.Office.Tools.Excel.ListObject
   vstoListObject=piaListObject.GetVstoObject( );

Embodiments may further implement internal caching of returned objects to ensure that multiple wrappings are not performed on the same native object. For example, one embodiment implements internal caching of the returned VSTO object using the hashtable provided by the Primary Interop Assembly COM object's runtime callable wrapper, the user will always get the same VSTO object (using GetVstoObject( )) no matter how they get the runtime callable wrapper. For example, a Worksheet runtime callable wrapper could be obtained by calling either Application.ActiveSheet, or Application.Workbooks[1].Sheets[1], or by handling the Application.SheetActivate event. Calling GetVstoObject on any of the returned Worksheet runtime callable wrappers will return the same VSTO Worksheet wrapper every time.

The following discussion now refers to a number of methods and method acts that may be performed. It should be noted, that although the method acts may be discussed in a certain order, no particular ordering is necessarily required unless specifically stated, or required because an act is dependent on another act being completed prior to the act being performed.

Figure 2:
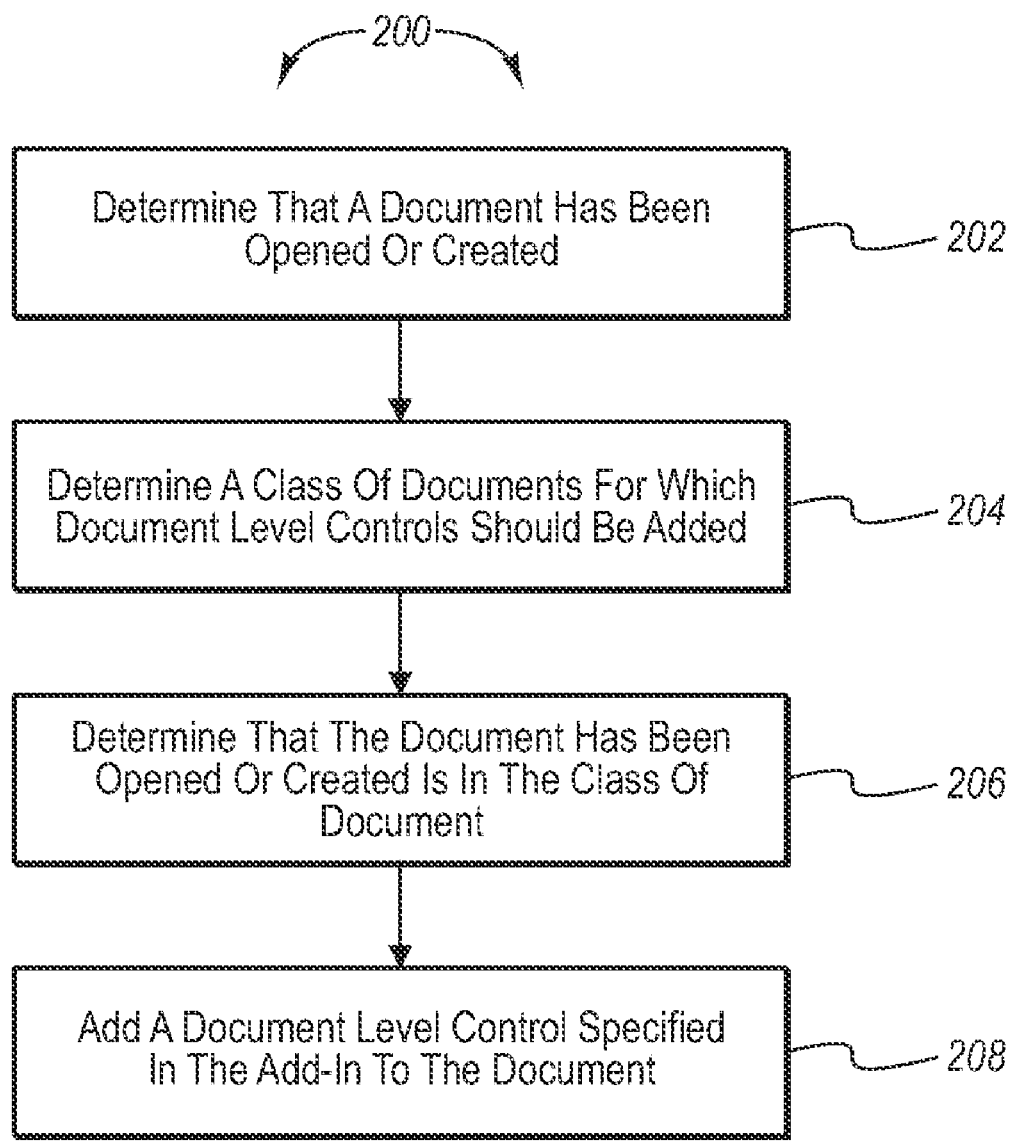
FIG. 2 illustrates a method of implementing application-level add-ins.

FIG. 2 illustrates a method 200 which may be practiced in a computing environment including an application where the application hosts documents. The method includes acts for facilitating an application wide add-in to add document level controls. The method includes determining that a document has been opened or created (act 202). For example FIG. 1 illustrates a document 114 opened in an application 116. The document may be a document created from scratch, or a document which has previously been stored.

The method 200 further includes determining a class of documents for which document level controls should be added (act 204). This may be performed by consulting an add-in such as the application object 108 illustrated in FIG. 1.

The method 200 further includes determining that the document that has been opened or created is in the class of document (act 206). For example, a determination may be made that the document 114 belongs to a class of documents for which document level controls 112 should be implemented.

The method 200 further includes adding a document level control specified in the add-in to the document (act 208). FIG. 1 illustrates the document control 112 added to the document 114.

The method 200 may be practiced where code for the document level control for the document is persisted until the document is closed, where after the document code is purged from memory and references to document level items are cleaned-up. In particular, embodiments may be implemented where programmatic code is configured to determine when a document has been closed. Once the document has been closed, code for implementing the document level code can be cleaned up. Additionally, application level add-in references to document level controls for a particular document can be disabled.

The method 200 may be practiced where adding a document level control is performed in response to a command to provide an enhanced control by wrapping a native control. For example, programmatic code may be implemented, such as programmatic code 102 shown in FIG. 1 which receives commands, or which includes commands to provide a wrapper 104 around a native control object 100.

The method 200 may be practiced to further include determining that a native control has not already been wrapped to create an enhanced control. In one embodiment, as described above, internal caching may be performed where returned objects are cached using a hashtable so as to ensure that only a single object is returned to prevent multiple wrappings of a given object. Thus, some embodiment of the method 200 may be practiced where determining that a native control has not already been wrapped to create an enhanced control comprises referencing an enhanced control cache.

The method 200 may be practiced where wrapping a native control is performed without having to wrap surrounding documents or higher level documents. For example, as described above, in a spreadsheet example, programmatic code does not need to specifically wrap a workbook for document level control that were previously wrapped for use in a sheet of the workbook.

Embodiments herein may comprise a special purpose or general-purpose computer including various computer hardware, as discussed in greater detail below.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computing environment comprising an application executing on a computer system that includes one or more processors, wherein the application hosts documents, a method of facilitating application level add-in to add document level controls, the method comprising:
   the computer system creating an enhanced native control object by wrapping a native control object with a wrapper that defines one or more extension methods, the one or more extension methods being configured to be called by an application level add-in to add and remove document level controls from the native control object for documents opened or created in the application, the application level add-in being configured to act under a first root object corresponding to an add-in class;
   the computer system determining, by the application level add-in, that a particular document has been opened or created in the application;
   the computer system determining, by the application level add-in, a class of documents for which document level controls should be added;
   the computer system determining, by the application level add-in, that the particular document that has been opened or created is in the class of documents;
   based on determining that the particular document is in the class of documents, the computer system determining, by the application level add-in, and that a particular document level control is to be added to the particular document;
   the computer system adding, by the application level add-in, the particular document level control to the particular document by calling the one or more extension methods of the enhanced native control object, the document level control being configured to act under a different second root object representing the particular document;
   the computer system monitoring, by the application level add-in, the particular document to determine when the particular document is closed; and
   upon the application level add-in determining that the particular document has been closed, the application level add-in removing the particular document level control to prevent the particular document level control from further executing by calling the one or more extension methods of the enhanced native control object.

2. The method of claim 1, further comprising caching the enhanced native control object.

3. The method of claim 2, wherein reusing the cached enhanced native control object when the particular document is reopened.

4. The method of claim 1, wherein determining, from the add-in, a class of documents for which document level controls should be added comprises determining that all documents opened in the application are in the class of documents.

5. The method of claim 1, wherein determining, from the add-in, a class of documents for which document level controls should be added comprises determining that documents based on a particular document template are in the class of documents.

6. The method of claim 1, wherein determining, from the add-in, a class of documents for which document level controls should be added comprises determining the role of a user opening or creating the particular document.

7. The method of claim 1, wherein adding the particular document level control to the particular document comprises wrapping a native control to allow the native control to be implemented as a document level control based on interaction with the application wide add-in.

8. The method of claim 1, wherein the particular document level control comprises one or more portions that are configured to be displayed graphically on a surface of the document.

9. In a computing environment comprising an application, wherein the application hosts documents, a computer readable memory device that stores computer executable instructions that, when executed by a processor of a computer system, are configured to cause the following to be performed:
   the computer system creating an enhanced native control object by wrapping a native control object with a wrapper that defines one or more extension methods, the one or more extension methods being configured to be called by an application level add-in to add and remove document level controls from the native control object for documents opened or created in the application, the application level add-in being configured to act under a first root object corresponding to an add-in class;
   the computer system determining, by the application level add-in, that a particular document has been opened or created in the application;
   the computer system determining, by the application level add-in, a class of documents for which document level controls should be added;
   the computer system determining, by the application level add-in, that the particular document that has been opened or created is in the class of documents;
   based on determining that the particular document is in the class of documents, the computer system determining, by the application level add-in, and that a particular document level control is to be added to the particular document;
   the computer system adding, by the application level add-in, the particular document level control to the created particular document by calling the one or more extension methods of the enhanced native control object, the document level control being configured to act under a different second root object representing the particular document;
   the computer system monitoring, by the application level add-in, the particular document to determine when the particular document is closed; and upon the application level add-in determining that the particular document has been closed, the application level add-in removing the particular document level control to prevent the particular document level control from further executing by calling the one or more extension methods of the enhanced native control object.

10. The device of claim 9, further comprising caching the enhanced native control object, and reusing the enhanced native control object when the particular document is reopened.

11. A computer system comprising:

a processor; and system memory storing executable instructions which, when executed by the processor, perform the following functions:

creating an enhanced native control object by wrapping a native control object with a wrapper that defines one or more extension methods, the one or more extension methods being configured to be called by an application level add-in to add and remove document level controls from the native control object for documents opened or created in the application, the application level add-in being configured to act under a first root object corresponding to an add-in class;

determining, by the application level add-in, that a particular document has been opened or created in the application;

determining, by the application level add-in, a class of documents for which document level controls should be added;

determining, by the application level add-in, that the particular document that has been opened or created is in the class of documents;

based on determining that the particular document is in the class of documents, the computer system determining, by the application level add-in, and that a particular document level control is to be added to the particular document;

adding, by the application level add-in, the particular document level control to the particular document by calling the one or more extension methods of the enhanced native control object, the document level control being configured to act under a different second root object representing the particular document;

monitoring, by the application level add-in, the particular document to determine when the particular document is closed; and upon the application level add-in determining that the particular document has been closed, the application level add-in removing the particular document level control to prevent the particular document level control from further executing by calling the one or more extension methods of the enhanced native control object.

12. The computer system of claim 11 wherein the functions performed further include caching the enhanced native control object.

13. The computer system of claim 11 wherein the functions performed further include reusing the cached enhanced native control object when the particular document is reopened.

14. The computer system of claim 11, wherein determining, from the add-in, a class of documents for which document level controls should be added comprises determining that documents based on a particular document template are in the class of documents.

15. The computer system of claim 11, wherein determining, from the add-in, a class of documents for which document level controls should be added comprises determining the role of a user opening or creating the particular document.

* * * * *